United States Patent
Kushida et al.

(12)
(10) Patent No.: US 6,490,752 B2
(45) Date of Patent: Dec. 10, 2002

(54) INVERTER CONTROL CIRCUIT OF MOTOR-DRIVEN BLOWER FOR ELECTRIC VACUUM CLEANER, DRIVE CONTROL CIRCUIT USING THE SAME, AND ELECTRIC VACUUM CLEANER USING DRIVE CONTROL CIRCUIT

(75) Inventors: Hiroyuki Kushida, Odawara (JP); Tsuyoshi Takanose, Fuji (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/940,434

(22) Filed: Aug. 29, 2001

(65) Prior Publication Data

US 2002/0056169 A1 May 16, 2002

(30) Foreign Application Priority Data

Aug. 29, 2000 (JP) .................................. 2000-258763
Aug. 22, 2001 (JP) .................................. 2001-251943

(51) Int. Cl.⁷ .................................................. A47L 9/28
(52) U.S. Cl. ........................................... 15/319; 15/412
(58) Field of Search ........................... 15/319, 412, 339

(56) References Cited

U.S. PATENT DOCUMENTS 4,880,474 A    11/1989  Koharagi et al.
4,920,607 A  *  5/1990  Kohn .......................... 15/319
4,958,406 A     9/1990  Toyoshima et al.
RE34,286 E  *  6/1993  Toyoshima et al. ........... 15/319
5,243,732 A  *  9/1993  Koharagi et al. ............. 15/319
5,381,584 A  *  1/1995  Jyoraku et al. ............... 15/319

FOREIGN PATENT DOCUMENTS

JP    60-242827   12/1985
JP    63-249488   10/1988
JP    63-249490   10/1988
JP     7-28547     3/1995
JP    07-337067   12/1995

\* cited by examiner

*Primary Examiner*—Chris K. Moore
(74) *Attorney, Agent, or Firm*—Oblon, Spivak, McClelland, Maier & Neustadt, P.C.

(57) ABSTRACT

An electric vacuum cleaner including a motor-driven blower driven by an inverter circuit. The inverter circuit has a plurality of switching elements. The inverter circuit AC-drives a motor-driven blower according to periodic switching between the switching elements. The periodic switching is based on the detected value of physical quantities related to the electric vacuum cleaner. The electric vacuum cleaner can, in the highest operation mode, undergo a sudden fluid load variation. The electric vacuum cleaner is able to limit, by way of the inverter circuit, the unpleasant sound produced by the vacuum cleaner due to the change in rotation velocity of a rotor of a motor of the vacuum cleaner.

17 Claims, 7 Drawing Sheets

INVERTER CONTROL CIRCUIT OF MOTOR-DRIVEN BLOWER FOR ELECTRIC VACUUM CLEANER, DRIVE CONTROL CIRCUIT USING THE SAME, AND ELECTRIC VACUUM CLEANER USING DRIVE CONTROL CIRCUIT

CROSS REFERENCE TO RELATED APPLICATION

The present application is based on Japanese Priority Documents 2000-258763 filed on Aug. 29, 2000 and 2001-251943 filed on Aug. 22, 2001, the content of which is incorporated herein by reference.

BACKGROUND OF THE INVENTION

1. Field of the Invention

The present invention relates to an inverter control circuit suitable for use in a motor-driven blower for an electric vacuum cleaner, a drive control circuit using the inverter control circuit, and an electric vacuum cleaner using the drive control circuit. The electric vacuum cleaner described herein includes various devices for collecting various solids or fluids into a collecting area by use of negative pressure.

2. Discussion of the Background

An electric vacuum cleaner needs to rotate a rotor of a motor used as a drive source therefor at high speed for the purpose of an improvement in dust's suction performance. On the other hand, the conventional electric vacuum cleaner has a problem that since a commutator motor is used in its motor, the life of a brush becomes short with high-speed rotation of the commutator motor in the commutator motor accompanied by mechanical friction produced between a commutator and the brush, and sparks are produced from the brush according to conditions.

In order to overcome such a problem, such an electric vacuum cleaner using a brushless motor as described in Unexamined Patent Publication No. Sho 60(1985)-242827, or a method of controlling an electric vacuum cleaner using a brushless motor such as described in each of Examined Patent Publication Nos. Hei 7(1995)-28546 and Hei 7(1995)-28547 has been proposed.

There has recently been a demand for an electric vacuum cleaner intended for size and weight reduction and high performance in the field of the electric vacuum cleaner. Therefore, it becomes increasingly necessary to bring its motor portion into less size, increase its rotation velocity, bring its power consumption under control, and take countermeasures against noise produced from the electric vacuum cleaner, for example. Thus, the noise produced from the electric vacuum cleaner will be considered below.

Lots of sounds of types, which change in sound quality in proportion to a rotation velocity (rotational frequency) of a rotor of a motor, exist in characteristic sounds produced from the cleaner. They include, for example, a frequency sound identical to the rotational frequency, a frequency sound coincident with the product of the number of vanes or blades of an impeller and a rotational frequency, etc. A problem arises in that the frequency of a characteristic sound produced due to such a rotation velocity greatly changes when the cleaner is in use, i.e., while the cleaner is making cleaning. As a result, discomfort is given to a user. This is because since a suction port of the cleaner is placed on or separated from a cleaned surface, the state of the cleaned surface changes, and various types of dust are sucked into the suction port, a motor-driven blower placed under cleaning undergoes a sudden change in fluid load. Namely, since the rotation velocity (rotational frequency) of the rotor of the motor also changes suddenly with such a fluid load variation, the frequency of the characteristic sound produced due to the rotation velocity also changes, thus leading to discomfort being given to the user. In particular, uncomfortable feeling in the highest operation mode of the cleaner is great.

SUMMARY OF THE INVENTION

Accordingly, an object of the present invention is to reduce a change in characteristic sound produced due to a rotation velocity of a rotor of a motor, which gives uncomfortable feeling to a user.

The object of the present invention is achieved by the novel inverter control circuit suitable for use in a motor-driven blower for an electric vacuum cleaner, novel drive control circuit using the inverter control circuit, and novel electric vacuum cleaner using the drive control circuit of the present invention.

According to the novel inverter control circuit suitable for use in a motor-driven blower for an electric vacuum cleaner of the present invention, an inverter circuit, which has a plurality of switching elements and AC-drives the motor-driven blower according to periodic switching between these switching elements, are controlled based on detected value of physical quantity detecting means which detects physical quantities related to the electric vacuum cleaner. The inverter control circuit of the present invention includes means for setting a period in which a rotation velocity of the motor-driven blower is calculated, means for performing interrupt processing including a calculation of the rotation velocity of the motor-driven blower based on the detected value of the physical quantity detecting means, and means for generating a pulse signal according to a carrier wave having a period shorter than a period in which the rotation velocity of the motor-driven blower is calculated, and longer than the time required to perform interrupt processing including the calculation of the rotation velocity of the motor-drive blower, and inputting the pulse signal into a drive circuit which drives the switching elements of the inverter circuit according to the input pulse signal.

The present invention also defines the drive control circuit using the inverter control circuit and the electric vacuum cleaner using the drive control circuit.

According to the novel drive control circuit using the inverter control circuit, it is proved the inverter circuit which has a plurality of switching elements and AC-drives the motor-driven blower according to periodical switching between these switching elements, based on detected value of physical quantity detecting means which detects physical quantities related to the electric vacuum cleaner, and the drive circuit which drives the switching elements of the inverter circuit according to input pulse signal, as well as the above inverter control circuit.

According to the novel electric vacuum cleaner using the drive control circuit of the present invention, it is provided a housing having a fluid suction port, the motor-driven blower accommodated in the housing so as to be capable of sucking a fluid from the fluid suction port, and physical quantity detecting means which detects physical quantities related to the motor-driven blower, as well as the above drive control circuit.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Preferred embodiments of the present invention will hereinafter be described with reference to FIGS. 1 through 6.

1. Hardware Configuration

Figure 1:
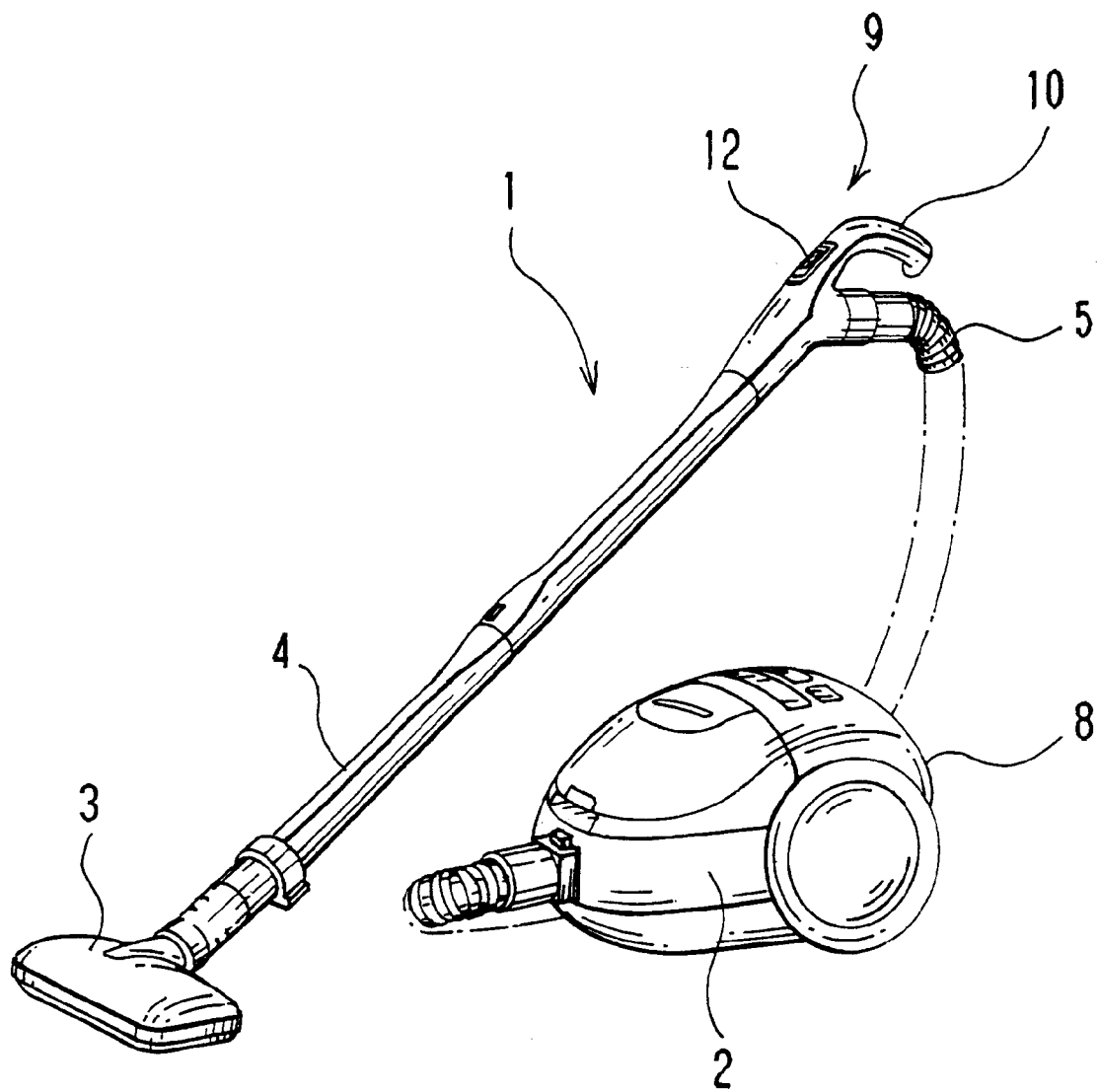
FIG. 1 is a perspective view showing an external configuration of an electric vacuum cleaner as the present embodiment.

FIG. 1 is a perspective view showing an external configuration of an electric vacuum cleaner 1. The present electric vacuum cleaner 1 is constituted such that a hose 5 to which a two-division configured extension pipe 4 in which a suction port body 3 is detachably fit to a leading end portion is detachably connected, is detachably mounted to a housing 2 which constitutes a base of the electric vacuum cleaner 1.

A motor-driven blower 8 comprising a motor 6, an air blower 7 corresponding to a centrifugal air blower, etc. is built in the housing 2. The hose 5 is connected to the housing 2 in such a manner that a base end thereof communicates with the suction side of the motor-driven blower 8 through an unillustrated dust chamber. A hand control 11 having such a form as to branch from the hose 5 backward is provided at the leading end of the hose 5. In the hand control 11, a free end portion of the leading end thereof that branches from the house 5 backward, serves as a grip or grip portion 10, and a control button 12 is provided at a position where it can be operated with the thumb of an operator who grasps the grip 10. The control button 12 is a so-called slide switch and doubles as a power switch for the motor-driven blower 8. Further, the control button 12 is configured so as to be capable of selecting and setting a plurality of types of operation modes for respectively bringing the motor-driven blower 8 to driven states different from one another. Namely, the control button 12 switches the operation mode to four stages of "stop", "low", "medium" and "high". Further, the two-division configured extension pipe 4 having the leading end to which the suction port body 3 is detachably mounted, is detachably mounted to the hand control 11.

Figure 2:
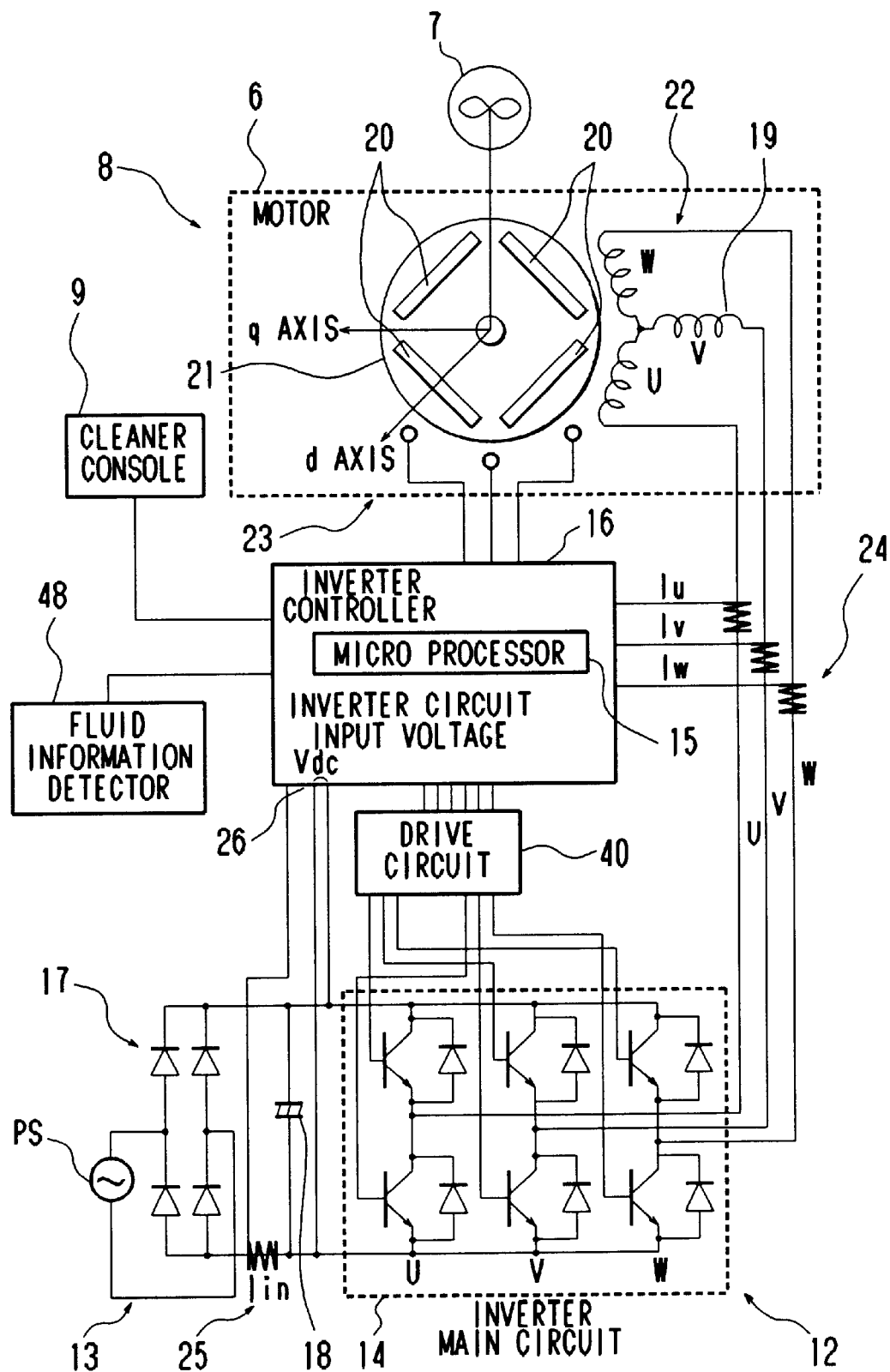
FIG. 2 is a circuit diagram illustrating a drive control circuit of a motor-driven blower.

FIG. 2 is a circuit diagram showing a drive control circuit 12 of the motor-driven blower 8. The drive control circuit 12 has the principle of operation that the motor 6 of the motor-driven blower 8 is rotatably driven by a high-frequency current produced from an inverter main circuit 14 used as an inverter circuit high-frequency driven with a power unit 13 as a drive source. Further, the drive control circuit 12 has such a circuit configuration that the inverter main circuit 14 is driven and controlled by an inverter controller 16 as an inverter control circuit including a microprocessor 15. The details of the respective parts or components will be explained below.

In the power unit 13, an AC voltage generated from a commercial AC source is converted to a DC voltage under rectifying and smoothing effects of a rectifier circuit 17 and a smoothing capacitor 18, followed by supply to the inverter main circuit 14 in such a DC voltage mode or form.

The inverter main circuit 14 has a configuration wherein six semiconductor switching elements (switching elements), e.g., power transistors are connected in three-phase bridge form, and diodes are respectively connected in parallel with the power transistors. The inverter main circuit 14 is controlled based on a PWM (Pulse Width Modulation) waveform outputted from the inverter controller 16 with the microcomputer 15 as a main body and supplies a DC voltage to each of armature windings 19 of the motor 6. a The motor 6 is of a three-phase brushless DC motor 6 and includes a rotor 21 in which permanent magnets 20 provided in two-pole pairs are embedded, and a stator 22 having the plurality of armature windings 19. A core of the rotor 21 is made up of silicon steel or the like having high permeability.

Now the drive control circuit 12 of the motor-driven blower 8 is provided with a rotor position detecting means 23 for detecting a rotational or angular position of the rotor 21. The rotor position detecting means 23 is configured as a physical quantity detecting means for detecting physical quantities related to the electric vacuum cleaner 1, i.e., the rotational position of the rotor 21 in the present embodiment. As such a rotor position detecting means 23, three magnetic sensors (position sensors in FIG. 4) installed at intervals of 120 electrical degrees are used. Upon implementation thereof, a structure using an optical pulse encoder, such a structure that a voltage induced in the corresponding armature winding 19 during a current-noncarrying de-energization period is detected by a voltage phase detecting means, etc. are available as other rotor position detecting means 23. Such a rotor position detecting means 23 detects magnetic pole positions every predetermined intervals of the rotor 21, and the microprocessor 15 of the inverter controller 16 computes the rotation velocity of the rotor 21 and turn on timings provided for the respective phases by use of the magnetic pole positions indicative of detected information thereof, and supplies suitable currents to the armature windings 19 of the stator 21, thereby generating a revolving field.

The drive control circuit 12 of the motor-driven blower 8 is also provided with an armature current detecting means 24 for detecting currents that flow through the armature windings 19 of the motor 6. The armature current detecting means 24 is configured as a physical quantity detecting means (current detecting means) for detecting physical quantities related to the electric vacuum cleaner 1, i.e., a current flowing through each armature winding 19 in the motor 6 in the present embodiment. Such an armature current detecting means 24 comprises three current sensors for detecting currents Iu, Iv and Iw flowing through the windings of the respective phases of U, V and W, and a circuit configuration for detecting voltages applied across three resistors by means of the inverter controller 16.

Further, the drive control circuit 12 of the motor-driven blower 8 includes an inverter circuit current detecting means 25 for detecting a current Iin flowing through the inverter main circuit 14, and an inverter circuit input voltage detecting means 26 for detecting a voltage Vdc inputted to the inverter main circuit 14 both of which are used as means different from the above means for detecting the currents flowing through the armature windings 19. The inverter circuit current detecting means 25 is configured as a physical quantity detecting means for detecting the current Iin flowing through the inverter main circuit 14, which is used as a means different from the above means for detecting the physical quantities related to the electric vacuum cleaner 1, i.e., the currents flowing through the armature windings 19 in the present embodiment. Such an inverter circuit current detecting means 25 comprises a current sensor, and such a circuit configuration that a voltage applied across a resistor interposed and connected between the rectifier circuit 17 and the smoothing capacitor 18 is detected by means of the inverter controller 16.

The inverter circuit input voltage detecting means 26 is configured as a physical quantity detecting means for detecting the physical quantities related to the electric vacuum cleaner 1, i.e., the voltage Vdc inputted to the inverter main circuit 14 in the present embodiment. Such an inverter circuit input voltage detecting means 26 comprises such a circuit configuration that the voltage Vdc rectified and smoothed by the rectifier circuit 17 and the smoothing capacitor 18 and inputted to the inverter main circuit 14 is detected by the inverter controller 16.

In addition to the above, in order to accurately control the electric vacuum cleaner 1, the microprocessor 15 of the inverter controller 16 converts each of various detected values of physical quantities related to the electric vacuum cleaner 1 into a digital signal and thereafter performs a digital filtering process when lots of noise are contained in the detected values of the physical quantities related to the electric vacuum cleaner 1. For instance, a finite impulse response (FIR) filtering process or the like is carried out. An arithmetic expression of an FIR filter is given by the following equation (1):

$$Y(n) = \sum_{k=0}^{n} A(k) \cdot X(n-k) \quad (1)$$

Figure 3A:
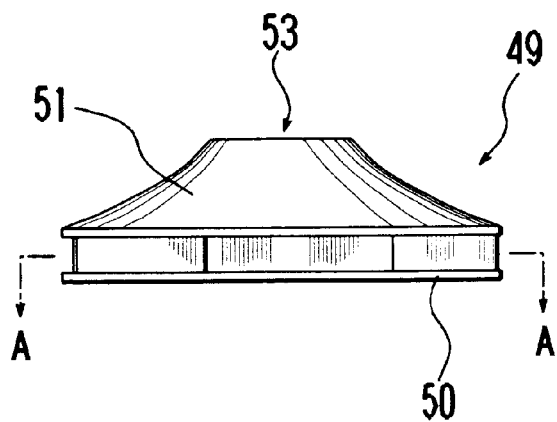
FIGS. 3A is a side view summarily showing an impeller of a centrifugal air blower.
Figure 3B:
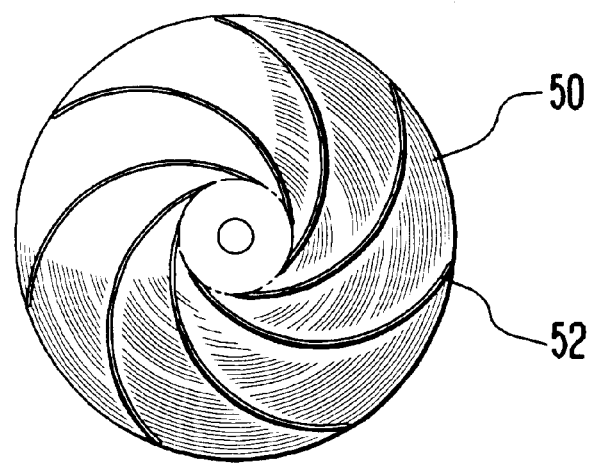
FIGS. 3B is front view summarily showing an impeller of a centrifugal air blower.

FIG. 3A is a side view summarily showing the form of an impeller 49 of the centrifugal air blower 7. FIG. 3B is front view summarily showing the form of an impeller 49 of the centrifugal air blower 7. Since the centrifugal air blower is excellent in performance as one used for the electric vacuum cleaner, it has heretofore been in wide use. The impeller 49 comprises a main plate 50, a side plate 51 and a plurality of vanes or blades 52. The vanes 52 have a plurality of convex portions formed thereon, which are respectively fit and fastened up in their corresponding holes defined in the main plate 50 and the side plate 51 and fixed therein. A frequency sound coincident with the product of the number of the vanes 52 and a rotational frequency is produced from the air blower as a characteristic sound.

Figure 4:
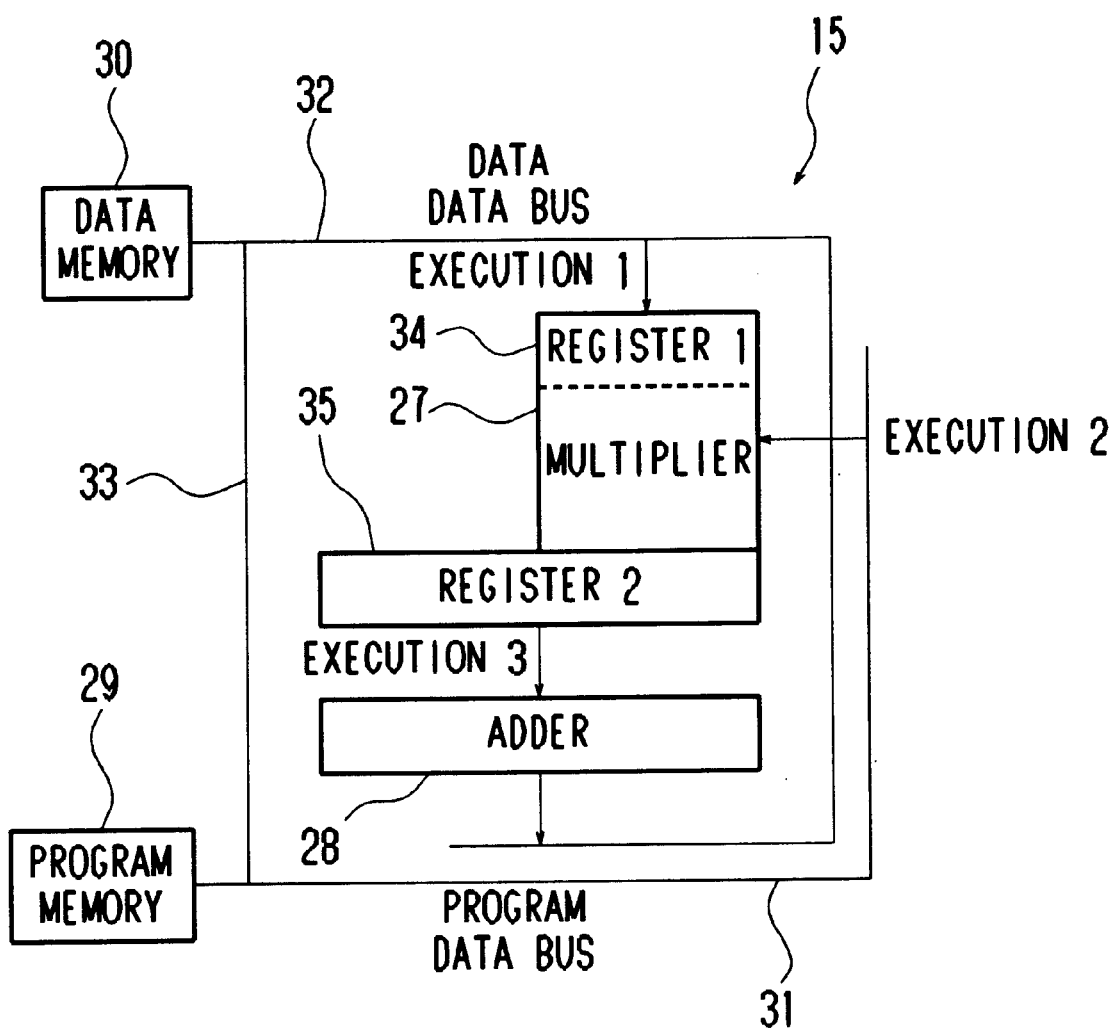
FIG. 4 is a schematic diagram illustrating a part of an internal configuration of a microprocessor included in an inverter controller.

FIG. 4 is a schematic diagram showing part of an internal configuration of the microprocessor 15 included in the inverter controller 16. The microprocessor 15 is provided thereinside with a multiplier 27 and an adder 28 which constitute a logical operation unit. Further, the microprocessor 15 includes a program bus 31 connected to a program memory 29, and a data bus 32 connected to a data memory 30 as buses respectively connected to the program memory 29 and the data memory 30 placed on the same chip or outside. Furthermore, the microprocessor 15 is also provided with a bus 33 which connects between the program memory 29 and the data memory 30. Besides, the multiplier 27 also includes a register 1 for taking in one of two data to be multiplied by each other in advance, and a register 2 for storing the result of multiplication therein. Also the microprocessor 15 includes various peripherals or the like for performing the input/output of data, which are mounted on the same chip.

While an execution 1 related to the transfer of data to the multiplier 27 is carried out through the use of the data bus 32, an execution 3 of processes such as the transfer of data between the multiplier 27 and the adder 28 is done by use of a bus which has no relation to the data bus 32. Therefore, the execution 1 and the execution 3 can be carried out concurrently (simultaneously). An execution 2 related to the transfer of data to the multiplier 27 is carried out through the use of the program data bus 31 normally used for capturing a program in a decoder without having to use the data bus, whereby the execution 2 can be carried out in parallel (simultaneously) with the execution 1 and the execution 3. Accordingly, the executions 1, 2 and 3 can be performed in parallel, and hence the transfer of data to the multiplier 27 and the adder 28 and the parallel processing for the multiplier 27 and the adder 28 can be executed. Since a chip area is retrained from increasing and the inverter controller 16 can be reduced, the microprocessor 15 having such architecture is suitable for the movable electric vacuum cleaner 1.

2. Control

A description will next be made of control of the motor 6 by the inverter controller 16. A description will be made here of control sharing the use of the hardware configuration of the electric vacuum cleaner 1 referred to above.

Figure 5:
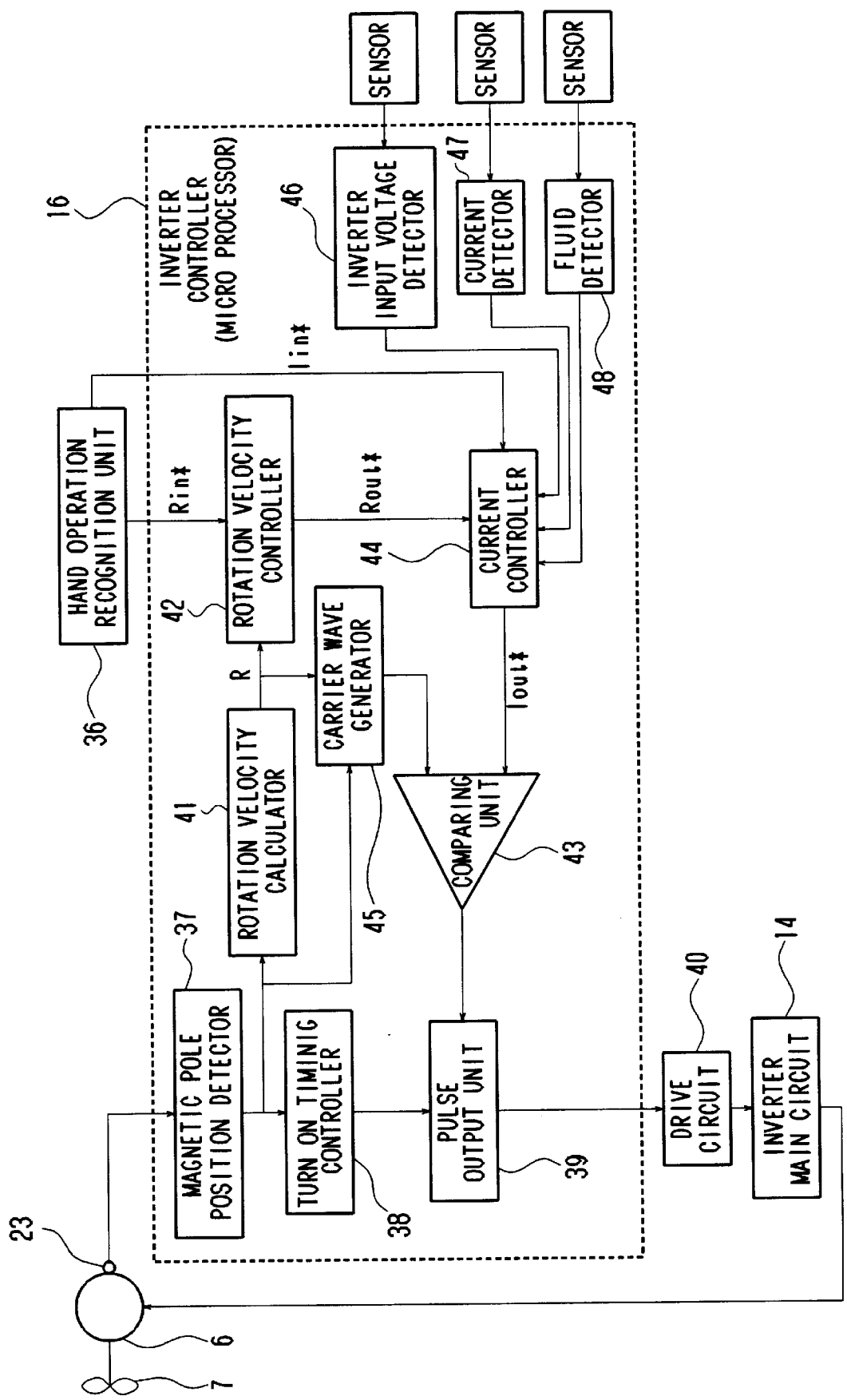
FIG. 5 is a function block diagram of the inverter controller related to control of the motor-driven blower.

FIG. 5 is a function block diagram of the present invention. The microprocessor 15 included in the inverter controller 16 is a microcomputer (not shown) comprising a CPU for executing various computing processes and concentratedly controlling respective parts, and various memories. The microprocessor 15 executes a predetermined computing process and an input/output process of various signals in accordance with operation programs stored in a memory to thereby control the respective parts. The function block diagram shown in FIG. 5 illustrates the function of such a microprocessor in the form of a block diagram.

On the basis of an instruction issued from a hand operation recognition unit 36, the inverter controller 16 basically detects magnetic pole positions of the rotor 21 of the motor 6 in the motor-driven blower 8, offers timing provided to supply a current to each phase and outputs a pulse signal subjected to PWM (Pulse Width Modulation) control.

As functional elements constituting such an inverter controller 16, the inverter controller 16 includes a detector for detecting physical quantities related to the electric vacuum cleaner 1, such as magnetic pole positions of the rotor 21, a voltage and each current inputted to the inverter circuit, and fluid information, etc., a turn on timing controller 38, a rotation velocity calculator 41, a rotation velocity controller 42, a current controller 44, a carrier wave generator 45, a comparing unit 43 and a pulse output unit 39. Most of them are subjected to software processing by the microprocessor 15. An advantage of the software processing resides in that the function of the inverter controller can easily be changed according to uses of the electric vacuum cleaner 1 without changing hardware.

A basic function of the inverter controller 16 is as follows. The current controller 44 generates a current control output value Iout*, based on a current instruction value Iin* supplied from the hand operation recognition unit 36 and detected values of the physical quantities related to the electric vacuum cleaner 1, and inputs the current control output value Iout* to the comparing unit 43 used as a PWM (Pulse Width Modulation) generating unit for comparison.

The comparing unit 43 is supplied with a triangular wave signal from the carrier wave generator 45 as a comparison reference, whereby a PWM waveform is extracted from the output of the comparing unit 43. A pulse signal is generated according to the PWM waveform and the timing provided to supply the current to each phase, i.e., turn on timing, which is supplied from the turn on timing controller 38 on the basis of each detected value of the magnetic pole position detector.

Figure 7:
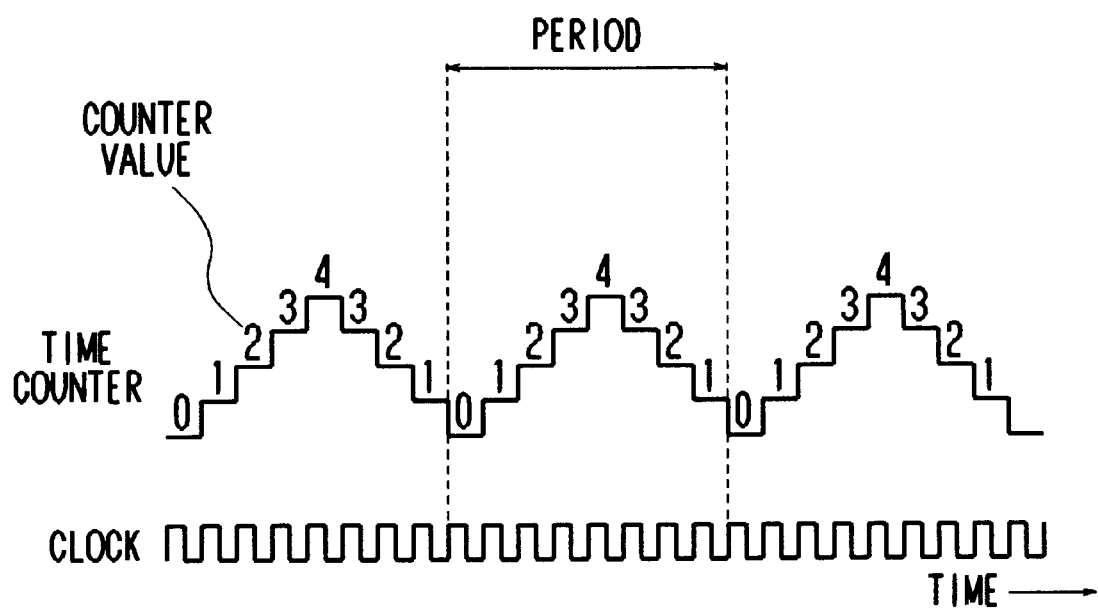
FIG. 7 is a timing chart for describing a method for generating pulse signal.

FIG. 7 is a timing chart for describing a method for generating the pulse signal. The microprocessor 15 includes a time counter (not shown) having functions, which count up and down counter values. The microprocessor 15 transforms the counter values of the time counter into the triangular wave with digital approximation technique using up counting and down counting function of the time counter, so that the microprocessor 15 generates the triangular wave signal, as shown in FIG. 7. The microprocessor 15 compares the counter values (the triangular wave signal) with the current control output value Iout*, so that the microprocessor 15 generates the pulse signal as the PWM waveform.

In response to the pulse signal generated in this way, a drive circuit 40 selectively drives and controls the semiconductor switching elements in the inverter main circuit 14. As a result, high-frequency voltage outputs are supplied to their corresponding armature windings 19 of the motor 6 to drive the motor 6. The drive circuit 40 can be provided outside of the microprocessor 15 or inside of the microprocessor 15. The drive circuit 40 is preferably provided outside of the microprocessor 15 if high power supply is necessary to drive the semiconductor switching elements in the inverter main circuit 14. If not, the drive circuit 40 provided inside of the microprocessor 15 can drive the semiconductor switching elements.

The function of the rotation velocity controller 42 will next be described. The rotation velocity controller 42 compares a rotation-velocity calculated value R calculated from each angle detected by the magnetic pole position detecting means 23 of the rotor 21 and its elapsed time with the upper-limit rotation velocity of the rotor 21, which is determined according to a mechanical strength or the like. When the rotation-velocity calculated value R exceeds the upper-limit rotation velocity, the rotation velocity controller 42 controls the rotation velocity of the rotor 21 so as to be limited to within the upper-limit rotation velocity.

Further, the rotation velocity controller 42 serves as a proportional integral control system. On the basis of the operation of the control button 12 of the hand control 11, the CPU of the microprocessor 15 recognizes operation modes (operation modes recognized by the hand operation recognition unit as a functional block) of four stages of "stop", "low", "medium" and "high", and subtracts the rotation-velocity calculated value R calculated from each angle detected by the magnetic pole position detecting means 23 of the rotor 21 and its elapsed time from a rotation velocity instruction value Rin* recognized according to each of the operation modes. Thus, a-rotation velocity output value Rout* is obtained using the following expression (2) by reference to the result of subtraction.

$$Rout^*_k = Rout^*_{k-1} + Kp(E_k - E_{k-1}) + Ki \cdot T \cdot E_{k-1} \quad (2)$$

In the expression (2), Rout* indicates a rotation velocity output value, E indicates an error between a rotation velocity instruction value Rin* and a rotation-velocity calculated value R, Kp indicates a proportional gain, Ki indicates an integral gain, and T indicates a detection cycle or period of a rotation velocity, respectively.

The current controller 44 generates a current control output value Iout*, based on a rotation velocity control output value Rout* supplied from the rotation velocity controller 42 and detected values of physical quantities related to the electric vacuum cleaner 1. The current control output value Iout* is inputted to the comparing unit 43 used as the PWM (Pulse Width Modulation) generating unit for comparison, and a triangular wave signal from the carrier wave generator 45 is supplied as a comparison reference, whereby a PWM waveform is taken out at the output of the comparing unit 43. A pulse signal is generated according to the PWM waveform and each of turn on timings for the respective phases, which is supplied from the turn on timing controller 38.

In response to the generated pulse signal, the drive circuit 40 selectively drives and controls the semiconductor switching elements in the inverter main circuit 14 in a manner similar to the above. As a result, high-frequency voltage outputs are supplied to their corresponding armature windings 19 of the motor 6 to drive the motor 6.

In such a configuration, the motor 6 constituting the motor-driven blower 8 of the electric vacuum cleaner 1 is rotatably driven by a current supplied from the inverter main circuit 14, so that the impeller 49 is rotated. The electric vacuum cleaner 1 sucks fluid, e.g., air into the housing 2 under the rotation of the impeller 49 and attracts non-sucked substances such as dust, foreign particles, etc. At this time, the motor 6 is rotatably driven in an optimum state according to the state of the control button 12 of the hand control 11, the rotational or angular position of the rotor 21 of the motor 6, the current flowing in the inverter main circuit 14, etc.

Figure 6:
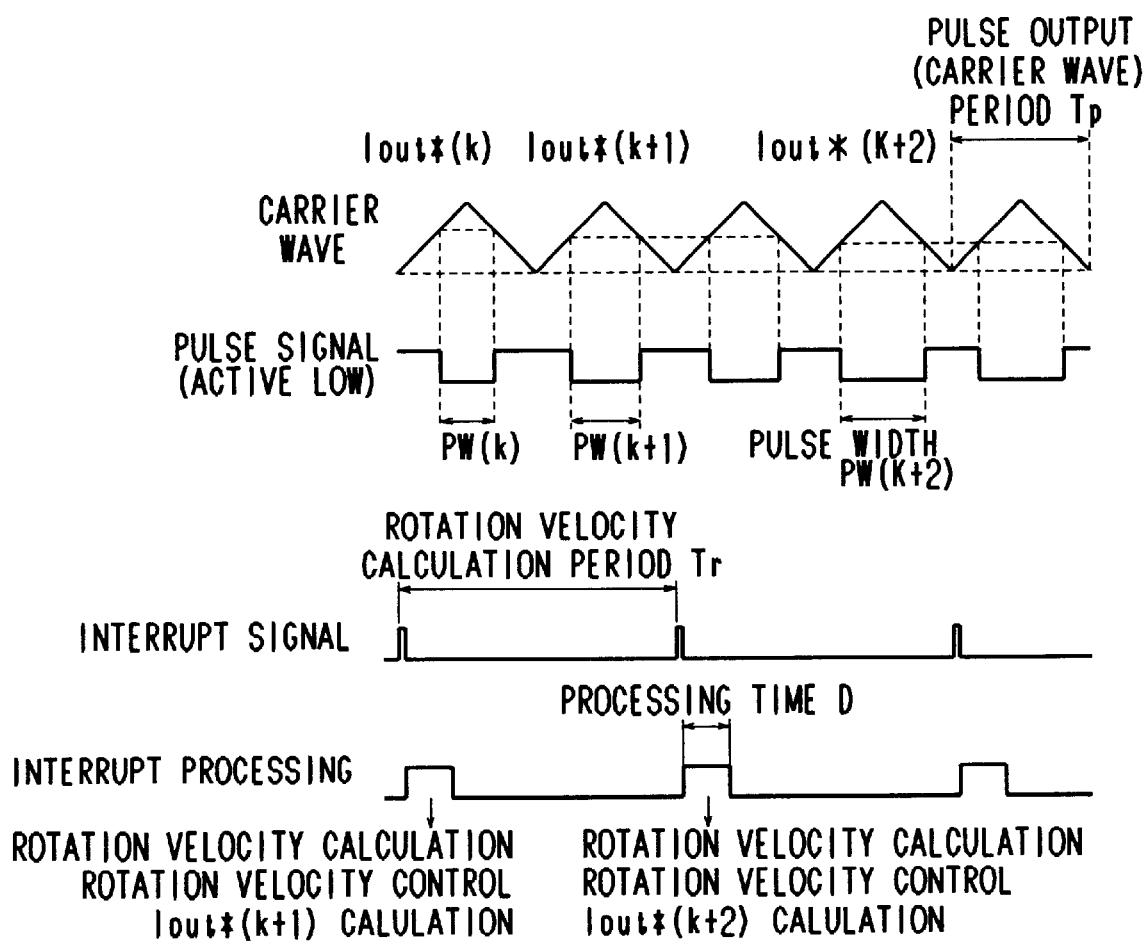
FIG. 6 is a timing chart for describing various signals.

FIG. 6 is a timing chart for describing a carrier wave of PWM, a pulse signal outputted from the inverter controller 16, an interrupt signal for rotation velocity calculation, an interrupt signal for interrupt processing, including a rotation velocity calculation period and a rotation velocity calculation, and its interrupt processing. Timings provided for the respective signals will now be explained in more details with reference to FIG. 6. The microprocessor 15 generates an interrupt signal in a period Tr or is supplied with an interrupt signal from the outside, and starts interrupt processing including the calculation of a rotation velocity in response to an interrupt signal as a trigger. As described above, the microprocessor 15 processes a rotation velocity calculation, rotation velocity control, the detection of each physical quantity, current control, etc. and calculates or computes a current control output value Iout*. The time required to process a series of interrupt processing including the calculation of the rotation velocity is given as D. Incidentally, the interrupt period Tr including the calculation of the rotation velocity is variable.

The current control output value Iout* is inputted to the comparing unit 43 used as the PWM (Pulse Width Modulation) generating unit for the purpose of comparison, and a carrier wave of a period Tp is supplied from the carrier wave generator 45 as a comparison reference, whereby a PWM waveform is taken out at the output of the comparing unit 43. When the value of the carrier wave reaches the current control output value Iout* or more in the example illustrated in FIG. 6, the pulse signal is taken active. Accordingly, an output period of the pulse signal also reaches Tp. Thus, the calculated value of rotation velocity is reflected on each pulse width and thereby the amount of a current flowing through each armature winding 19 is controlled, whereby the electric vacuum cleaner 1 having a desired output is obtained. Incidentally, the period Tp of the carrier wave supplied from the carrier wave generator 45 is variable and the value of the carrier wave might be reset (to zero) in a desired timing. When, for example, an interrupt signal is produced in accordance with each operation mode of the electric vacuum cleaner 1, the value of the carrier wave is reset. Further, when a suitable carrier wave period is set based on the calculated value of rotation velocity, the number of pulses outputted from the inverter controller 16 can be controlled within the rotation velocity calculation period. It is therefore possible to realize more accurate rotation velocity control.

The carrier wave period Tp is now set shorter than the period Tr for calculating the rotation velocity of the motor 6 in such a manner that at least one pulse is outputted within the rotation velocity calculation period. Further, the carrier wave period Tp is set longer than the time D required to perform the interrupt processing including the rotation velocity calculation of the motor 6, whereby a current control output value Iout* on which the rotation velocity value calculated by the interrupt processing is reflected, can be compared with a wave just subsequent to the carrier wave and reflected on the width of each pulse outputted from the inverter controller 16. In regard to this, FIG. 6 shows that Iout*(k+1) is calculated according to the interrupt processing including the rotation velocity calculation, the value thereof is immediately compared with the carrier wave, and a pulse of a width PW(k+1) is outputted. Thus, it is possible to control the rotation velocity of the motor 6 excellent in response. Therefore, even if the electric vacuum cleaner 1 being in use in the highest operation mode, for example, undergoes a sudden fluid load variation and the rotation velocity of the rotor 21 of the motor 6 abruptly changes due to the fluid load variation, the width of the pulse outputted from the inverter controller 16 changes quickly and the rotation velocity of the rotor 21 is promptly returned to a desired rotation velocity. Therefore, the time spent on an unpleasant sound produced due to the change in rotation velocity becomes short, and discomfort given to a user can be lessened.

Since the rotation velocity value calculated according to the interrupt processing can promptly be reflected on the pulse width, the rotation velocity can immediately be limited to within an upper-limit rotation velocity determined by a mechanical strength or the like even if the calculated value of rotation velocity exceeds the upper-limit rotation velocity. Accordingly, the electric vacuum cleaner 1 mechanically high in safety can be implemented.

If the rotor position detecting means 23 for detecting each rotational or angular position of the rotor 21 of the motor 6 is provided as the physical quantity detecting means related to the electric vacuum cleaner 1, then each position of the rotor 21 can be grasped accurately. It is therefore possible to suitably control the motor-driven blower according to the detected value.

If the current detecting means 24 and 25 for respectively detecting the currents flowing through the windings 19 of the motor 6 are provided as the physical quantity detecting means related to the electric vacuum cleaner 1, then currents that directly contribute to torque can be detected. Therefore, even when a fluid load suddenly changes, the motor-driven blower can suitably be controlled according to its detected value.

The inverter circuit input voltage detecting means 26 for detecting the voltage inputted to the inverter main circuit 14 is provided as the physical quantity detecting means related to the electric vacuum cleaner 1. Accordingly, even when an AC voltage generated from a commercial AC source PS or a voltage of a battery (not shown) suddenly changes and a voltage inputted to the inverter main circuit 14 suddenly changes, their behaviors can appropriately be grasped and the motor-driven blower can suitably be controlled according to their detected values.

A fluid information detector 48 used as a fluid detecting means for detecting a physical quantity of fluid which exerts an influence on the rotation of the fan 7, is provided as the physical quantity detecting means related to the electric vacuum cleaner 1. Accordingly, even when the amount of foreign particles or dust increases with cleaning and clogging occurs to thereby increase the degree of vacuum between the dust chamber and the motor-driven blower 8 thus resulting in a reduction in load applied to the motor-driven blower 8, the behavior of the electric vacuum cleaner 1 under cleaning can appropriately be grasped by detecting the state of the fluid in the electric vacuum cleaner 1, and the motor-driven blower 8 can suitably be controlled according to its detected value.

There are also provided a physical quantity detecting means for detecting each physical quantity related to the motor-driven blower 8, an inverter circuit having a plurality of switching elements and for AC-driving the motor-driven blower 8 according to periodical switching between these switching elements, and a carrier wave generator for outputting a carrier wave having a period shorter than a period for calculating or computing the rotation velocity of the motor-driven blower and longer than the time required to perform interrupt processing including calculation of the rotation velocity of the motor-drive blower. Therefore, even if a frequency sound coincident with the product of both the number of vanes or blades 52 of the centrifugal air blower 7 mounted to the electric vacuum cleaner 1 used as one excellent in suction performance, and a rotational frequency thereof changes due to a sudden change in fluid load and thereby an unpleasant sound is produced, the rotation velocity is accurately and promptly returned to a desired rotation velocity, and the time spent on the production of the unpleasant sound becomes short, thus making it possible to lessen discomfort given to a user.

In the present embodiment, the microprocessor 15 needs the repetition of such sum-of-products computations as expressed in the above equations (1) and (2). To this end, lots of instruction executions are required within the microprocessor. On the other hand, since the multiplier 27, and the adder 28 capable of executing processing in parallel with the processing to be executed by the multiplier 27 are provided in the present embodiment, the sum-of-products computation can be processed at high speed. As shown in FIG. 4 by way of example, the microprocessor 15 is provided with the buses for the program memory 29 and the data memory 30, the bus for connecting the program memory 29 and the data memory 30, the multiplier 27 and the adder 28 capable of executing the processing in parallel with the processing of the multiplier 27. Thus, since the time D required to perform the interrupt processing including the rotation velocity calculation can be taken short, the period Tp of the carrier wave of PWM can be set short. Even in the case of control on the electric vacuum cleaner 1 with the sum-of-products computations, the rotation velocity of the motor 6 more excellent in response can be controlled. Therefore, even if the rotation velocity of the rotor 21 of the motor 6 suddenly changes due to a change in fluid load, the rotation velocity thereof can be returned to a desired rotation velocity accurately and promptly. Thus, the time spent on an unpleasant sound produced due to the change in rotation velocity becomes short and hence discomfort given to a user can be lessened.

Obviously, numerous modifications and variations of the present invention are possible in light of the above teachings. It is therefore to be understood that within the scope of the appended claims, the invention may be practiced otherwise than as specifically described herein.

What is claimed is:

1. An inverter control circuit, suitable for use in a motor-driven blower for an electric vacuum cleaner, controlling an inverter circuit which has a plurality of switching elements and AC-drives the motor-driven blower according to periodical switching between these switching elements, based on detected value of physical quantity detecting means which detects physical quantities related to the electric vacuum cleaner, comprising:

means for setting a period in which a rotation velocity of the motor-driven blower is calculated;

means for performing interrupt processing including a calculation of the rotation velocity of the motor-driven blower based on the detected value of the physical quantity detecting means; and means for generating a pulse signal according to a carrier wave having a period shorter than a period in which the rotation velocity of the motor-driven blower is calculated, and longer than the time required to perform interrupt processing including the calculation of the rotation velocity of the motor-drive blower, and inputting the pulse signal into a drive circuit which drives the switching elements of the inverter circuit according to the input pulse signal.

2. An inverter control circuit according to claim 1, wherein the means for inputting the pulse signal into the drive circuit generates the pulse signal while the means for generating compares the carrier wave with a value obtained by the interrupt processing.

3. An inverter control circuit according to claim 2, wherein the carrier wave is a triangular wave.

4. An inverter control circuit according to claim 1, wherein the function of the means for generating a pulse signal and inputting the pulse signal into the drive circuit is performed by a microprocessor which executes computing process according to operation programs, and wherein the microprocessor includes a multiplier and an adder capable of performing processing in parallel with the multiplier to perform sum-of-products computations.

5. A drive control circuit suitable for use in a motor-driven blower for an electric vacuum cleaner, which drives and controls the motor-driven blower used as a suction drive source of the electric vacuum cleaner, comprising:

an inverter circuit which has a plurality of switching elements and AC-drives the motor-driven blower according to periodical switching between these switching elements, based on detected value of physical quantity detecting means which detects physical quantities related to the electric vacuum cleaner;

a drive circuit which drives the switching elements of the inverter circuit according to input pulse signal;

means for setting a period in which a rotation velocity of the motor-driven blower is calculated;

means for performing interrupt processing including a calculation of the rotation velocity of the motor-driven blower based on the detected value of the physical quantity detecting means; and means for generating the pulse signal according to a carrier wave having a period shorter than a period in which the rotation velocity of the motor-driven blower is calculated, and longer than the time required to perform interrupt processing including the calculation of the rotation velocity of the motor-drive blower, and inputting the pulse signal into the drive circuit.

6. A drive control circuit according to claim 5, wherein the means for inputting the pulse signal into the drive circuit generates the pulse signal while the means compares the carrier wave with a value obtained by the interrupt processing.

7. A drive control circuit according to claim 6, wherein the carrier wave is a triangular wave.

8. A drive control circuit according to claim 5, the function of the means for generating a pulse signal and inputting the pulse signal into the drive circuit is performed by a microprocessor which executes computing process according to operation programs, and wherein the microprocessor includes a multiplier and an adder capable of performing processing in parallel with the multiplier to perform sum-of-products computations.

9. An electric vacuum cleaner comprising:

a housing having a fluid suction port;

a motor-driven blower accommodated in the housing so as to be capable of sucking a fluid from the fluid suction port;

physical quantity detecting means which detects physical quantities related to the motor-driven blower;

an inverter circuit which has a plurality of switching elements and AC-drives the motor-driven blower according to periodic switching between these switching elements;

a drive circuit which drives the switching elements of the inverter circuit according to input pulse signal;

means for setting a period in which a rotation velocity of the motor-driven blower is calculated;

means for performing interrupt processing including a calculation of the rotation velocity of the motor-driven blower based on the detected value of the physical quantity detecting means; and means for generating the pulse signal according to a carrier wave having a period shorter than a period in which the rotation velocity of the motor-driven blower is calculated, and longer than the time required to perform interrupt processing including the calculation of the rotation velocity of the motor-drive blower, and inputting the pulse signal into the drive circuit.

10. An electric vacuum cleaner according to claim 9, wherein the means for inputting the pulse signal into the drive circuit generates the pulse signal while the means for generating compares the carrier wave with a value obtained by the interrupt processing.

11. An electric vacuum cleaner according to claim 10, wherein the carrier wave is a triangular wave.

12. An electric vacuum cleaner according to claim 9, wherein the physical quantity detecting means is rotor position detecting means which detects a rotational position of a rotor of a motor.

13. An electric vacuum cleaner according to claim 9, wherein the physical quantity detecting means is current detecting means which detects a current flowing through each of windings of the motor.

14. An electric vacuum cleaner according to claim 9, wherein the physical quantity detecting means is inverter circuit input voltage detecting means which detects a voltage inputted to the inverter circuit.

15. An electric vacuum cleaner according to claim 9, wherein the physical quantity detecting means is fluid detecting means which detects a physical quantity of the fluid influencing the rotation of a fan.

16. An electric vacuum cleaner according to claim 9, wherein the fan of the motor-driven blower is a centrifugal air blower.

17. An electric vacuum cleaner according to claim 9, the function of the means for generating a pulse signal and inputting the pulse signal into the drive circuit is performed by a microprocessor which executes computing process according to operation programs, and wherein the microprocessor includes a multiplier and an adder capable of performing processing in parallel with the multiplier to perform sum-of-products computations.

\* \* \* \* \*